United States Patent
Prümm et al.

(10) Patent No.: US 11,649,778 B2
(45) Date of Patent: May 16, 2023

(54) METHOD FOR OPERATING AN INTERNAL COMBUSTION ENGINE, IN PARTICULAR A GAS ENGINE

(71) Applicant: Keyou GmbH, Munich (DE)

(72) Inventors: Franz Werner Prümm, Koblenz (DE); Daniel Thomas Koch, Munich (DE)

(73) Assignee: KEYOU GMBH, Munich (DE)

( * ) Notice: Subject to any disclaimer, the term of this patent is extended or adjusted under 35 U.S.C. 154(b) by 0 days.

(21) Appl. No.: 17/274,367

(22) PCT Filed: Aug. 13, 2019

(86) PCT No.: PCT/EP2019/071678
§ 371 (c)(1),
(2) Date: Mar. 8, 2021

(87) PCT Pub. No.: WO2020/057866
PCT Pub. Date: Mar. 26, 2020

(65) Prior Publication Data
US 2022/0049668 A1    Feb. 17, 2022

(30) Foreign Application Priority Data
Sep. 19, 2018  (DE) .................. 10 2018 122 963.1

(51) Int. Cl.
*F02D 41/14* (2006.01)
*F02D 41/18* (2006.01)
(Continued)

(52) U.S. Cl.
CPC ......... *F02D 41/1475* (2013.01); *F02D 41/18* (2013.01); *F02D 41/26* (2013.01);
(Continued)

(58) Field of Classification Search
CPC ...... F02D 41/1475; F02D 41/18; F02D 41/26; F02D 2200/04; F02D 2200/101;
(Continued)

(56) References Cited

U.S. PATENT DOCUMENTS

| 5,447,137 A | 9/1995 | Asano et al. |
| 5,642,709 A * | 7/1997 | Ozaki ............... B60W 30/1819 |
| | | 123/486 |

(Continued)

FOREIGN PATENT DOCUMENTS

| CN | 1637254 A | 7/2005 |
| CN | 101363372 A | 2/2009 |

(Continued)

OTHER PUBLICATIONS

PCT; App. No. PCT/EP2019/071678; International Search Report and Written Opinion dated Oct. 25, 2019.

(Continued)

*Primary Examiner* — Hung Q Nguyen
*Assistant Examiner* — Susan E Scharpf
(74) *Attorney, Agent, or Firm* — Fitch, Even, Tabin & Flannery, LLP (57) ABSTRACT

The invention relates to a method for operating an internal combustion engine comprising: determining a first set point value of a volume of air to be taken into the combustion chamber of the internal combustion engine within one working cycle thereof by retrieving the first set point value from a first characteristic map stored in a memory device of an electronic computing device as a function of a current engine speed of the internal combustion engine and as a function of a torque to be provided by the internal combustion engine; and determining a second set point value by retrieving the second set point value from a second characteristic map stored in the memory device of the electronic (Continued)

computing device as a function of a current engine speed of the internal combustion engine and as a function of a current volume of air supplied to the combustion chamber.

15 Claims, 5 Drawing Sheets

(51) Int. Cl.
*F02D 41/26* (2006.01)
*F02P 5/15* (2006.01)

(52) U.S. Cl.
CPC ........ *F02P 5/1502* (2013.01); *F02D 2200/04* (2013.01); *F02D 2200/101* (2013.01)

(58) Field of Classification Search
CPC ............. F02D 41/0027; F02D 41/0047; F02D 2041/1472; F02D 2200/0418; F02D 41/2422; F02D 41/2416; F02D 19/02; F02D 41/0007; F02D 2041/141; F02D 2200/1002; F02P 5/1502; F02P 5/045; F02P 5/1516; F02P 5/1528; Y02T 10/30; Y02T 10/40; F02M 21/0206
See application file for complete search history.

(56) References Cited

U.S. PATENT DOCUMENTS

| | | | | |
|---|---|---|---|---|
| 5,727,528 A * | 3/1998 | Hori | ........................ | F02D 41/18 123/486 |
| 5,964,200 A * | 10/1999 | Shimada | .................. | F02D 43/00 123/568.21 |
| 5,967,114 A * | 10/1999 | Yasuoka | .............. | F02D 41/3064 123/295 |
| 6,123,056 A * | 9/2000 | Shimada | .............. | F02D 41/2422 123/488 |
| 6,192,857 B1 * | 2/2001 | Shimada | .................. | F01L 13/06 477/109 |
| 6,415,218 B2 * | 7/2002 | Shimada | .................. | F02D 41/18 701/115 |
| 2004/0055281 A1 * | 3/2004 | Tang | ................... | F02D 41/0027 60/278 |
| 2004/0237512 A1 * | 12/2004 | Tang | ..................... | F01N 3/0842 60/301 |
| 2007/0012289 A1 * | 1/2007 | Yamaguchi | ............. | F02D 37/02 123/406.47 |
| 2013/0206119 A1 | 8/2013 | Ando et al. | | |
| 2016/0090929 A1 * | 3/2016 | Tanaka | .................... | F02D 21/08 123/406.12 |
| 2016/0153373 A1 * | 6/2016 | Yoshizaki | ............... | F02D 13/02 123/406.48 |
| 2016/0177849 A1 * | 6/2016 | Surnilla | .................. | F02P 5/153 701/103 |
| 2017/0276067 A1 * | 9/2017 | Hand, III | ............ | F02D 41/1444 |
| 2018/0163641 A1 * | 6/2018 | Han | ...................... | F02D 35/023 |
| 2018/0171936 A1 * | 6/2018 | McQuillen | ......... | F02M 35/1038 |

FOREIGN PATENT DOCUMENTS

| | | |
|---|---|---|
| CN | 103180586 A | 6/2013 |
| CN | 204961094 U | 1/2016 |
| CN | 205154394 U | 4/2016 |
| CN | 105649789 A | 6/2016 |
| CN | 105863855 A | 8/2016 |
| CN | 106715873 A | 5/2017 |
| DE | 19711477 A1 | 9/1997 |
| DE | 10123476 A1 | 11/2002 |
| DE | 10340816 A1 | 3/2005 |
| DE | 102010006290 A1 | 8/2011 |
| DE | 112013007079 T5 | 2/2016 |
| DE | 102017130371 A1 | 6/2018 |
| DE | 112013007227 B4 | 8/2018 |
| JP | S5388414 A | 8/1978 |
| JP | H06117306 A | 4/1994 |
| JP | H10318049 A | 12/1998 |
| JP | 2016151230 A | 8/2016 |
| JP | 2017166385 A | 9/2017 |
| WO | 2009031005 A2 | 3/2009 |
| WO | 2012056515 A1 | 5/2012 |

OTHER PUBLICATIONS

DPMA; App. No. 10 2018 122 963.1; Examination Report dated May 13, 2019.

JPO; App No. 2021-505734; Office Action, dated Apr. 26, 2022 (English Office Action summary).

CNIPA, Application No. 2019800616828, Search Report and Office Action dated Sep. 15, 2022.

* cited by examiner

METHOD FOR OPERATING AN INTERNAL COMBUSTION ENGINE, IN PARTICULAR A GAS ENGINE

CROSS-REFERENCE TO RELATED APPLICATIONS

This application is a U.S. national phase application of International Application No. PCT/EP2019/071678, filed Aug. 13, 2019, designating the United States, which claims priority to German Application No. 10 2018 122 963.1, filed Sep. 19, 2018.

FIELD

The invention relates to a method for operating an internal combustion engine, in particular a gas engine, preferably for a motor vehicle.

BACKGROUND

Internal combustion engines such as for example gas engines, in particular for motor vehicles, are already sufficiently known from the general prior art. Such an internal combustion engine comprises at least one combustion chamber, which is supplied at least with air and fuel for operating the internal combustion engine, in particular in the fueled operation thereof, within a respective working cycle of the internal combustion engine. Thereby, a mixture also referred to as fuel-air mixture is formed in the combustion chamber within the respective working cycle, which includes at least the fuel and the air, which are taken into the combustion chamber. As is further sufficiently known, the mixture has a combustion-air ratio, which is also referred to as lambda ($\lambda$). The combustion-air ratio is also termed air ratio or air number and is a dimensionless index, which indicates the mass ratio of the air to the fuel. The combustion-air ratio relates the air mass actually available for a combustion of the mixture or the fuel to the at least required stoichiometric air mass, which is at least needed for complete combustion of the fuel. If the combustion-air ratio is 1, thus, the combustion-air ratio is considered as the stoichiometric combustion-air ratio. If the combustion-air ratio is greater than 1, thus, the mixture includes a higher mass of air than is required for complete combustion of the fuel such that the mixture is lean. If the combustion-air ratio is less than 1, thus, the actual air mass is lower than the air mass, which is at least required for a complete combustion of the fuel, such that the mixture is rich.

It is the object of the present invention to provide a method for operating an internal combustion engine, in particular a gas engine, such that a particularly high specific power and a particularly high efficiency of the internal combustion engine can be realized, wherein the pollutant emissions of the internal combustion engine can be kept to a particularly low extent at the same time.

SUMMARY

According to the invention, this object is solved by a method having the features of claim 1. Advantageous configurations with convenient developments of the invention are specified in the remaining claims.

In the method according to the invention for operating an internal combustion engine, in particular for a motor vehicle, the internal combustion engine comprises at least one combustion chamber for example formed as a cylinder. In particular, the internal combustion engine can comprise multiple combustion chambers for example formed as cylinders. Preferably, the method is performed during a fueled operation of the internal combustion engine, wherein combustion processes proceed in the combustion chamber during the fueled operation. Therein, the internal combustion engine for example comprises an output shaft, via which the internal combustion engine can provide torques for driving the motor vehicle for example formed as a utility vehicle, in particular as a bus. Therein, the internal combustion engine is preferably formed as a four-cycle engine. In addition, it is preferably provided that a working cycle of the internal combustion engine includes exactly two complete revolutions of the output shaft for example formed as a crankshaft and thus 720 degrees of crank angle. Within the respective working cycle, a combustion proceeds in the combustion chamber, which is also referred to as combustion process. Preferably, the internal combustion engine is formed as a reciprocating piston engine such that a piston is translationally movably accommodated in the combustion chamber. The piston is for example connected to the output shaft in articulated manner via a connection rod, wherein the piston is driven by the respective combustion proceeding in the combustion chamber within the respective working cycle. Hereby, the output shaft is driven and thereby rotated around its rotational axis.

In a first step of the method, a first set point value of an amount of air to be taken into the combustion chamber of the internal combustion engine within a respective working cycle thereof is ascertained by means of an electronic computing device also referred to as control unit, in particular of the internal combustion engine and of the motor vehicle, respectively, in that the first set point value is retrieved from a first characteristic map stored in a memory device of the electronic computing device depending on a current speed of the internal combustion engine and depending on a torque to be provided by the internal combustion engine, in particular via the output shaft. A current speed is to be understood by the current speed of the internal combustion engine, with which the output shaft currently or presently rotates around its rotational axis, in particular relative to at least one case element of the internal combustion engine.

For example, the case element is a crankcase, on which the output shaft is rotatably supported. A torque is to be understood by the torque to be provided by the internal combustion engine, which is to be provided by the internal combustion engine, in particular via its output shaft. In other words, a torque demand is to be understood by the torque to be provided by the internal combustion engine, which is made to the internal combustion engine for example by the electronic computing device. The torque demand is for example adjusted or preset by the driver of the motor vehicle in that the driver actuates, in particular moves, an operating element. The operating element is for example a pedal also referred to as accelerator, which is actuated by the driver with his foot and thereby for example can be moved into different positions. The respective position corresponds to a respective torque demand, which is made to the internal combustion engine if the pedal is moved into the respective position by the driver. This means that the driver can preset or adjust the torque to be provided by the internal combustion engine by actuating the operating element. For example, the electronic computing device converts the actuation of the operating element effected by the driver into the torque demand, that is into the torque to be provided by the internal combustion engine, such that the torque demand is for example made to the internal combustion engine by the electronic computing device. In particular, it is to be understood by it that the electronic computing device operates, in particular regulates or controls, the internal combustion engine such that the torque to be provided by the internal combustion engine or demanded is provided by the internal combustion engine, in particular via the output shaft.

The respective working cycle, for which the first set point value of the amount of the air to be taken into the combustion chamber within the respective working cycle is for example ascertained, is also referred to as considered working cycle.

In a second step of the method, a second set point value is ascertained by means of the electronic computing device in that the second set point value is retrieved from a second characteristic map stored in the memory device of the electronic computing device depending on the current speed of the internal combustion engine and depending on a current amount of air supplied to the combustion chamber. By the current amount of the air supplied to the combustion chamber, an amount of the air also referred to as air amount is to be understood, which is for example currently, in particular at a point of time, at which the second step is performed, received in the combustion chamber. Further, the following can be understood by the current amount of the air supplied to the combustion chamber: The amount of the air to be taken into the combustion chamber of the internal combustion engine within the considered working cycle thereof is an amount of air, which for example is or is to be taken into the combustion chamber within the considered working cycle, wherein the considered working cycle is in the future related to the ascertainment of the first set point value and the second set point value or adjoins to the ascertainment of the first set point value and the second set point value in time since the first set point value for example is or has to be first calculated, wherein only thereupon an amount of air corresponding to the first set point value optionally can be taken into the combustion chamber. In this respect, an amount of air for example is to be understood by the current amount of the air supplied to the combustion chamber, which is or was supplied to the combustion chamber within an earlier working cycle preceding the considered working cycle in time, wherein the earlier working cycle for example immediately precedes the considered working cycle or the first step or the second step, such that a further working cycle of the internal combustion engine is not between the considered working cycle and the earlier working cycle and the first step and the second step, respectively.

Within the second step of the method, it is provided that the second set point value is a second set point value of an amount of recirculated exhaust gas to be taken into the combustion chamber within the considered working cycle. Alternatively, it is provided within the second step that the second set point value is a second set point value of an amount of water, in particular water vapor, contained in a mixture to be taken into the combustion chamber within the considered working cycle.

In a third step of the method, a third set point value of a combustion-air ratio to be adjusted in the combustion chamber within the considered working cycle associated with the first set point value and the second set point value is ascertained by means of the electronic computing device in that the third set point value is retrieved from a third characteristic map stored in the memory device depending on the current speed of the internal combustion engine and depending on the current amount of the air supplied to the combustion chamber. By the term "working cycle" used in the following, the considered working cycle is to be understood if another working cycle such as for example the earlier working cycle is not explicitly mentioned.

The method according to the invention is a method based on characteristic map for operating the internal combustion engine, in particular in the fueled operation thereof. Therein, it has been found that a particularly high specific power and a particularly high efficiency of the internal combustion engine can be realized by the method according to the invention. At the same time, the pollutant emissions of the internal combustion engine can be kept to a particularly low extent.

It has proven particularly advantageous if the internal combustion engine is a gas engine and is operated as a gas engine, respectively. Herein, a gaseous fuel is preferably used as the fuel, which is preferably taken into the combustion chamber, in particular directly blown into the combustion chamber, in gaseous manner. It has proven particularly advantageous if the internal combustion engine or the gas engine is formed as a hydrogen engine. Herein, hydrogen ($H_2$) is used as the fuel, which is taken into the combustion chamber, in particular directly blown into the combustion chamber, in gaseous manner.

In order to realize a particularly low-emission operation, it is preferably provided that the internal combustion engine is operated in a lean operation such that the combustion-air ratio, which is also referred to as lambda ($\lambda$), is greater than 1 and preferably is at least 1.2 or is greater in comparison with it.

In particular, the following realization underlies the invention: stoichiometrically operated hydrogen aspirated engines with catalytic exhaust gas aftertreatment are sufficiently known and have advantages with respect to an only low pollutant emission and a low technical complexity. However, disadvantages of such stoichiometrically operated aspirated engines with catalytic exhaust gas aftertreatment are in a very low efficiency, which is usually lower than 30 percent, and in a low specific power, since only a very low effective medium pressure of less than 10 bar can be realized.

In addition, turbocharged hydrogen lean engines without exhaust gas aftertreatment are known. They have low pollutant emissions and a high efficiency of usually more than 40 percent. With respect to aspirated engines, such turbocharged lean engines and exhaust gas aftertreatments have an increased specific power, but which is severely limited by the knock limit and the high air demand. In order to further increase the specific power—as was found—the employment of an exhaust gas recirculation is advantageous. Within the scope of such an exhaust gas recirculation, exhaust gas of the internal combustion engine is recirculated and taken into the combustion chamber. The combustion chamber is supplied at least with fuel and with air within the respective working cycle such that at least or exactly one mixture also referred to as fuel-air mixture, which comprises the fuel and the air, which are or were supplied to the combustion chamber, is formed within the respective working cycle. If an exhaust gas recirculation is performed, thus, the mixture also includes recirculated exhaust gas. Therein, the mixture has the previously mentioned combustion-air ratio. As was found, an exhaust gas recirculation has a similar effect as an increase of the combustion-air ratio and in particular causes a decreasing nitrogen oxide formation. Experimental studies of the applicant unexpectedly yielded an over-proportional influence of the exhaust gas recirculation or of the exhaust gas recirculation rate thereof on the, also experimentally ascertained, knock limit of the internal combustion engine restricting power and torque. This is attributable to the fact that upon addition of exhaust gas to the fuel-air mixture also referred to as fresh mixture, a required air excess, which is characterized by the combustion-air ratio, can be severely reduced. With an effective medium pressure PME of 16 bar, a combustion-air ratio of 2.4 without exhaust gas recirculation can for example be reduced to a combustion-air ratio of less than 1.7 with exhaust gas recirculation. As a result, the cylinder charge is also reduced, whereby the pressure in the combustion chamber also referred to as cylinder and formed as a cylinder, respectively, decreases and the mechanical stress of the internal combustion engine is reduced. It appeared that the specific power and the torque of the internal combustion engine also referred to as engine can be increased by more than 10 to 15 percent by the employment of an exhaust gas recirculation (EGR). At the same time, the efficiency of the engine is increased, the pollutant emissions are reduced. Upon application of an internal mixture formation, within the scope of which the fuel is directly taken, in particular blown or injected, into the combustion chamber, an increase of the specific powers of the torque by more than 20 to 25 percent seems to be realizable.

However, an adjustment of the torque to be provided by the internal combustion engine, in particular by the output shaft, also referred to as torque control has proven to be problematic, in particular during an operation, in particular upon application of external mixture formation. Within the scope of the external mixture formation, for example at a location of an intake tract of the internal combustion engine capable of being flown through by the air, which is arranged upstream of the combustion chamber, the fuel is taken, in particular injected or blown, into the intake tract. As causes for problems in the adjustment of the torque, there were identified:

With gasoline engine controls, the power output is usually controlled via the amount of air, which is supplied to the engine. The supplied air mass is determined. The required amount of fuel is determined from it by means of a lambda set point value, which is recorded in characteristic maps. Similarly, the optimum ignition angle is stored in a characteristic map depending on the current speed and current air mass.

With inclusion of the EGR rate, the determination of the lambda set point value solely via a characteristic map is no longer possible because a too low lambda not adapted to the EGR rate results in knocking combustion. In contrast, if a too high lambda is adjusted, the demanded torque cannot be achieved. Furthermore, the ignition angle has to be corrected depending on the EGR rate to achieve an optimum efficiency and avoid knocking.

Thus, it is required and desirable, respectively, to develop a method, in which the demanded torque is provided in that the required air mass, the optionally provided or required EGR rate, an optimum ignition angle and the associated fuel mass are determined and for example pre-controlled and adjusted. The complexity of this desire is still further increased in that the regulation and control circuits of the air, EGR and fuel path mutually influence by the mixture of all of the components in a charge mixture distribution pipe also referred to as intake manifold. In directly taking or injecting or blowing the fuel into the combustion chamber, the fuel path can be decoupled from the air and EGR path, whereby the complexity can be slightly reduced.

The previously mentioned problems can be avoided by means of the method according to the invention such that a particularly low-emission operation of the internal combustion engine as well as a particularly high specific power and a high efficiency of the internal combustion engine preferably formed as a gas engine can be realized by means of the method according to the invention.

It has proven particularly advantageous if a fourth set point value of the combustion-air ratio to be adjusted in the combustion chamber within the considered working cycle is ascertained by means of the electronic computing device in that the fourth set point value is retrieved from a fourth characteristic map stored in the memory device depending on the current speed of the internal combustion engine and depending on the current amount of the air supplied to the combustion chamber, wherein a knock-free operation of the internal combustion engine without exhaust gas recirculation is achievable by adjusting the combustion-air ratio to the fourth set point value. In other words, if the combustion-air ratio was actually adjusted to the fourth set point value or if the fourth set point value of the combustion-air ratio was actually adjusted, thus, a knock-free operation of the internal combustion engine without exhaust gas recirculation, that is while exhaust gas recirculation is omitted, would be achieved from it, wherein it is not necessarily provided within the scope of the method that the combustion-air ratio is actually adjusted to the fourth set point value. Thus, the fourth set point value is for example only an auxiliary or basic value, which can result in an operation of the internal combustion engine free of exhaust gas recirculation and free of knocking at the same time, if the fourth set point value would be adjusted, wherein the fourth set point value is not necessarily actually adjusted.

Therein, it has proven particularly advantageous if a fifth set point value of the combustion-air ratio to be adjusted in the combustion chamber within the working cycle is ascertained by interpolation, in particular by linear interpolation, between the third set point value and the fourth set point value by means of the electronic computing device, wherein the combustion-air ratio is adjusted to the fifth set point value by means of the electronic computing device. Here, it is apparent that the fourth set point value is used as an auxiliary or basic value to perform an interpolation between the third set point value and the fourth set point value and to thereby ascertain, in particular calculate, the fifth set point value based on the third set point value and the fourth set point value. Finally, the combustion-air ratio is actually adjusted to the fifth set point value. In other words, the fifth set point value is adjusted. Hereby, an operation of the internal combustion engine particularly low in emission as well as beneficial in efficiency can be realized. Basically, it is conceivable that the interpolation yields that the fifth set point value corresponds to the fourth or the third set point value such that the third or the fourth set point value is finally actually adjusted. Therein, the interpolation can for example be performed based on the fourth set point value. Hereby, it can be ensured that the internal combustion engine can be knock-free operated particularly low in emission and beneficial in efficiency as well as with a high specific power.

In a particularly advantageous embodiment of the invention, a sixth set point value of an ignition timing associated with the second set point value and with the current amount of the air supplied to the combustion chamber is ascertained by means of the electronic computing device in that the sixth set point value is retrieved from a fifth characteristic map depending on the current speed and depending on the current amount of the air supplied to the combustion chamber. The ignition timing is also referred to as ignition angle since the ignition timing corresponds to a rotational position of the output shaft also referred to as angular position, wherein the previously mentioned fuel-air mixture is ignited at the ignition timing and thus when the output shaft adopts the rotational position corresponding to the ignition timing and thus the ignition angle. A combustion of the fuel-air mixture is effected by the ignition of the fuel-air mixture. The ignition is preferably effected by extraneous ignition, in particular by means of a spark plug associated with the combustion chamber, in that for example at least one or more sparks are generated in the combustion chamber by means of the spark plug within the considered working cycle.

Therein, it has proven particularly advantageous if a seventh set point value of the ignition timing is ascertained by means of the electronic computing device in that the seventh set point value is retrieved from a sixth characteristic map depending on the current speed and depending on the current amount of the air supplied to the combustion chamber, wherein a knock-free operation of the internal combustion engine without exhaust gas recirculation is achievable by adjusting the ignition timing to the seventh set point value. The previous explanations to the fourth set point value can readily also be transferred to the seventh set point value. This means that the ignition timing is not necessarily actually adjusted to the seventh set point value, but the seventh set point value is a further auxiliary or correction value. If the ignition timing was adjusted to the seventh set point value, thus an operation of the internal combustion engine free of exhaust gas recirculation and free of knocking at the same time would result from it. Again expressed in other words, if the ignition timing was adjusted to the seventh set point value, thus, it would result from it that knocking of the internal combustion engine would be omitted, while the internal combustion engine is operated without the exhaust gas recirculation, that is while exhaust gas recirculation is omitted. However, the ignition timing therein does not necessarily have to be adjusted to the seventh set point value.

Therein, it has proven particularly advantageous if an eighth set point value of the ignition timing is ascertained by interpolation, preferably depending on the actual EGR rate, in particular by linear interpolation, between the sixth set point value and the seventh set point value, wherein the ignition timing is actually adjusted to the eighth set point value by means of the electronic computing device. Herein, it is apparent that the seventh set point value is used as an auxiliary or basic value to ascertain, in particular calculate, the eighth set point value by interpolation between the sixth and the seventh set point value based on the sixth set point value and the seventh set point value. Finally, the ignition timing is actually adjusted to the eighth set point value. Therein, it is conceivable that the interpolation yields that the eighth set point value corresponds to the sixth or seventh set point value, but the seventh set point value is used to perform the interpolation and thus to ascertain the eighth set point value.

A further embodiment is characterized in that a leaning factor, which is greater than or equal to 1, is ascertained based on a first characteristic line depending on a ratio between the second set point value and a current amount of the recirculated exhaust gas supplied to the combustion chamber by means of the electronic computing device. Therein, a fourth set point value of the combustion-air ratio to be adjusted in the combustion chamber within the working cycle is for example ascertained by means of the electronic computing device in that the third set point value is multiplied by the leaning factor, wherein the combustion-air ratio is actually adjusted to the fourth set point value by means of the electronic computing device. In other words, the fourth set point value is herein calculated in that the third set point value is multiplied by the leaning factor such that the fourth set point value is the result of the multiplication of the leaning factor by the third set point value.

Therein, it has proven particularly advantageous if a fifth set point value of an ignition timing associated with the second set point value and with the current amount of the air supplied to the combustion chamber is ascertained by means of the electronic computing device in that the fifth set point value is retrieved from a fourth characteristic map depending on the current speed and depending on the current amount of the air supplied to the combustion chamber. Therein, it is additionally provided that a distance value is ascertained based on a second characteristic line depending on a ratio between the second set point value and the current amount of the recirculated exhaust gas supplied to the combustion chamber by means of the electronic computing device, which is added to the fifth set point value, whereby a sixth set point value of the ignition timing is ascertained, wherein the ignition timing is adjusted to the sixth set point value by means of the electronic computing device.

A further embodiment is characterized in that a minimally admissible limit value of the combustion-air ratio to be adjusted in the combustion chamber within the working cycle is ascertained by means of the electronic computing device in that the minimally admissible limit value is retrieved from a fourth characteristic map depending on the current speed of the internal combustion engine and depending on a ratio between the second set point value and a current amount of recirculated exhaust gas supplied to the combustion chamber.

Therein, it has proven particularly advantageous if the third set point value is used as a first selection value and the minimally admissible limit value is used as a second selection value, wherein the electronic computing device selects the greater one of the selection values from the selection values, and wherein the combustion-air ratio is adjusted to the selected selection value by means of the electronic computing device.

In further configuration of the invention, an actual value of an amount of water contained in the mixture currently supplied to the combustion chamber is ascertained by means of the electronic computing device in that the actual value is retrieved from a fifth characteristic map depending on a current combustion-air ratio in the combustion chamber and depending on a current amount of the recirculated exhaust gas supplied to the combustion chamber. This embodiment is in particular provided if the second set point value is the second set point value of the amount of water contained in the mixture.

Therein, it has proven particularly advantageous if a fifth set point value of the amount of recirculated exhaust gas to be taken into the combustion chamber within the working cycle is ascertained by means of the electronic computing device in that the fifth set point value is retrieved from a sixth characteristic map depending on the third set point value and depending on the second set point value. This embodiment is in particular provided if the second set point value is the second set point value of the amount of water contained in the mixture.

In further configuration of the invention, a sixth set point value of an ignition timing associated with the second set point value and with the current amount of the air supplied to the combustion chamber is ascertained by means of the electronic computing device in that the sixth set point value is retrieved from a seventh characteristic map depending on the current speed and depending on the current amount of the air supplied to the combustion chamber. In addition, a seventh set point value of the ignition timing is ascertained by means of the electronic computing device in that the seventh set point value is retrieved from an eighth characteristic map depending on the current speed and depending on the current amount of the air supplied to the combustion chamber, wherein a knock-free operation of the internal combustion engine without exhaust gas recirculation is achievable by adjusting the ignition timing to the seventh set point value. The respective characteristic map is stored in the memory device. The seventh set point value is for example a third auxiliary or basic value, wherein the ignition timing is not necessarily actually adjusted to the seventh set point value, but a knock-free operation of the internal combustion engine without exhaust gas recirculation, that is if an exhaust gas recirculation is omitted, would result from an optionally effected or hypothetical adjustment of the ignition timing to the seventh set point value.

Therein, it has proven particularly advantageous if an eighth set point value of the ignition angle is ascertained by interpolation, in particular by linear interpolation, between the sixth set point value and the seventh set point value by means of the electronic computing device, wherein the ignition angle is actually adjusted to the eighth set point value by means of the electronic computing device. Herein, it is apparent that the seventh set point value is an auxiliary or basic value, based on which the eighth set point value, to which the ignition timing is then actually adjusted, is ascertained, in particular calculated, by interpolation between the seventh set point value and the sixth set point value.

Further advantages, features and details of the invention are apparent from the following description of preferred embodiments as well as based on the drawing. The features and feature combinations mentioned above in the description as well as the features and feature combinations mentioned below in the description of figures and/or shown in the figures alone are usable not only in the respectively specified combination, but also in other combinations or alone without departing from the scope of the invention.

BRIEF DESCRIPTION OF THE DRAWINGS

The drawings show in.

In the FIGS., identical or functionally identical elements are provided with identical reference characters.

DESCRIPTION OF THE PREFERRED EMBODIMENTS

In the following, various embodiments of a method for operating an internal combustion engine of a motor vehicle, in particular of a utility vehicle, are described. Therein, the method is performed during a fueled operation of the internal combustion engine. The internal combustion engine comprises at least one combustion chamber for example formed as a cylinder, in which a piston is for example translationally movably accommodated. Therein, the internal combustion engine comprises at least one case element for example formed as a crank case, in particular as a cylinder crank case, on which an output shaft of the internal combustion engine for example formed as a crank shaft is rotatably supported. Thus, the output shaft can rotate around a rotational axis relative to the case element with a speed, wherein the speed can vary. For example, the piston is connected to the output shaft in particular formed as a crank shaft in articulated manner via a connection rod, such that the translational movements of the piston in the cylinder (combustion chamber) are converted into a rotational movement of the output shaft around its rotational axis.

A working cycle of the internal combustion engine for example formed as a four-cycle engine includes exactly two complete revolutions and thus 720 degrees of crank angle of the output shaft, wherein at least air and fuel are introduced into the combustion chamber within the working cycle. By means of the method, respective amounts of the fuel and the air are for example ascertained, in particular calculated, for the respective working cycle, wherein the respective working cycle, for which the amounts are calculated, is also referred to as considered working cycle. For example, an earlier working cycle immediately or directly precedes the considered working cycle such that further working cycles of the internal combustion engine are not between the considered working cycle and the earlier working cycle. If it is spoken of "the working cycle" or "the respective working cycle" in the following, thus the considered working cycle is to be understood thereby. The air and the fuel, which are supplied to the combustion chamber, form a mixture also referred to as fuel-air mixture, which includes at least the fuel and the air. The mixture formed within the respective working cycle is ignited and combusted, wherefrom exhaust gas of the internal combustion engine results. By ignition of the mixture, the mixture is combusted such that combustion processes proceed in the combustion chamber within the fueled operation of the internal combustion engine. In particular, exactly one combustion proceeds within the respective working cycle. The piston and the output shaft via the piston are driven by the combustion of the mixture, whereby the internal combustion engine provides or can provide a torque for driving the motor vehicle via its output shaft.

Preferably, the internal combustion engine is a gas engine and preferably a hydrogen engine such that a gaseous fuel and preferably hydrogen is used as the fuel, which is also referred to as combustible. Within the respective working cycle, the fuel is taken into the combustion chamber, in particular blown into the combustion chamber. By an exhaust gas recirculation, it is to be understood that exhaust gas of the internal combustion engine is recirculated and taken into the combustion chamber such that the mixture also includes the recirculated exhaust gas.

Figure 1:
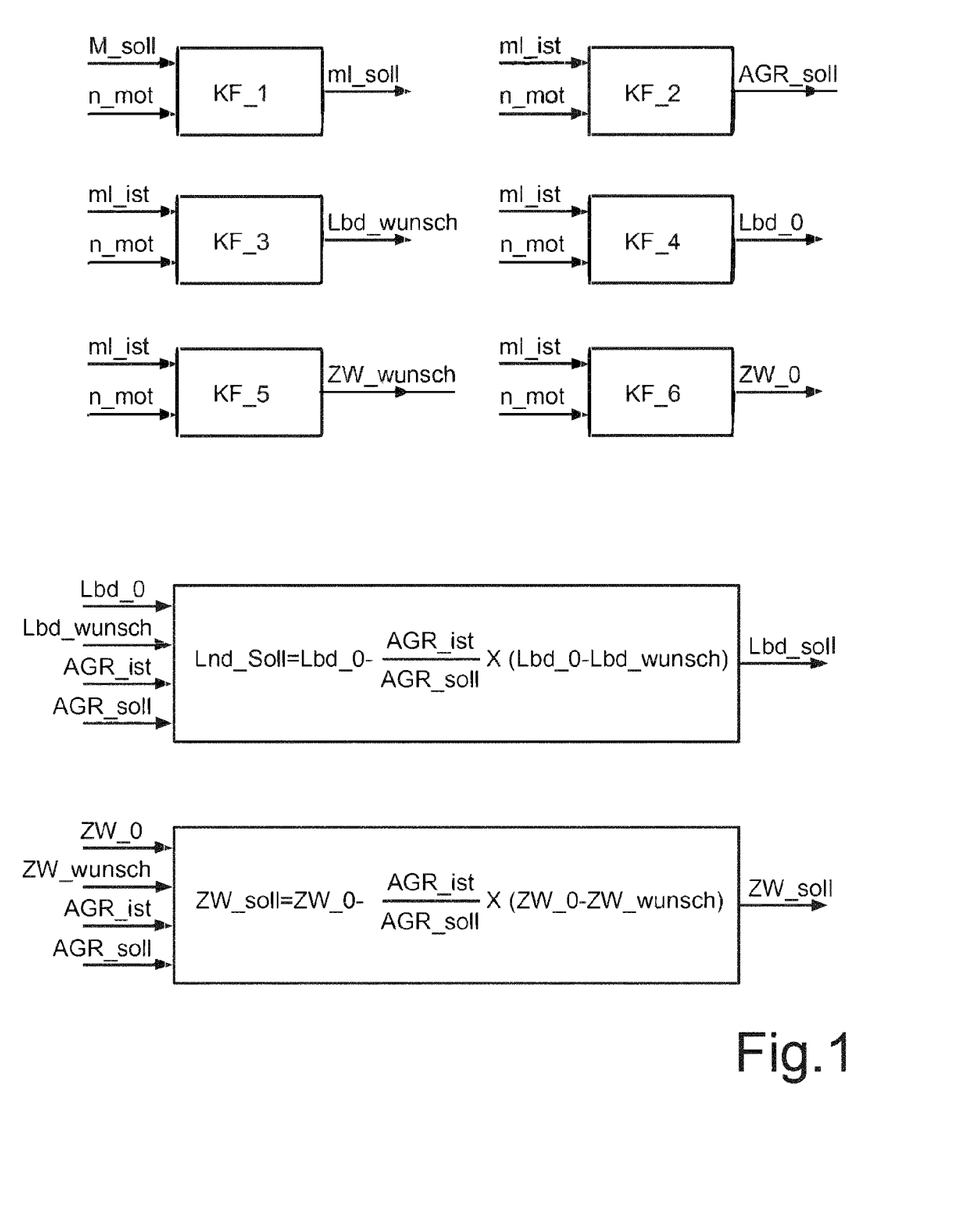
FIG. 1 diagrams for illustrating a first embodiment of a method according to the invention for operating an internal combustion engine, in particular of a motor vehicle.

FIG. 1 shows a first embodiment of the method. The internal combustion engine or the motor vehicle for example includes an electronic computing device also referred to as control unit or engine control or engine control unit, by means of which the method is performed. By means of the electronic computing device, a first set point value ml_soll of an amount of the air to be taken into the combustion chamber of the internal combustion engine within the working cycle thereof is ascertained, in particular calculated, in that the first set point value ml_soll is retrieved from a first characteristic map KF_1 stored in a memory device of the electronic computing device depending on a current speed n_mot of the internal combustion engine and the output shaft, respectively, and depending on a torque M_soll to be provided by the internal combustion engine via the output shaft. The torque M_soll to be provided by the internal combustion engine is a torque demand made to the internal combustion engine, which is for example made to the internal combustion engine by the electronic computing device, in particular such that the electronic computing device operates, in particular regulates or controls, the internal combustion engine such that the internal combustion engine provides the torque demand via the output shaft. In particular, the torque demand is for example adjusted by the driver of the motor vehicle in that the driver actuates, in particular moves, an operating element for example formed as a pedal. Thus, the torque demand is a torque set point value.

Preferably, it is provided at least in the first embodiment that an exhaust gas recirculation is performed. Within the scope of the exhaust gas recirculation, an amount of the exhaust gas of the internal combustion engine is recirculated and taken into the combustion chamber, wherein the amount of the exhaust gas, which is recirculated, is also referred to as EGR rate or exhaust gas recirculation rate. In ascertaining the first set point value M_soll, a provision of an optimum EGR rate is for example taken as a basis.

Further, a second set point value is ascertained by means of the electronic computing device in that the second set point value is retrieved from a second characteristic map KF_2 stored in the memory device of the electronic computing device depending on the current speed n_mot of the internal combustion engine and the output shaft, respectively, and depending on a current amount ml_ist of air supplied to the combustion chamber. The current amount of the air supplied to the combustion chamber is for example an amount of air, which is currently received in the combustion chamber or is or was supplied to the combustion chamber within the earlier working cycle. In the first embodiment shown in FIG. 1, the second set point value is a second set point value of an amount of recirculated exhaust gas to be taken into the combustion chamber within the working cycle, wherein the second set point value is denoted by AGR_soll in the first embodiment. The second set point value AGR_soll is also referred to as EGR set point value and is for example the previously mentioned EGR rate, the provision of which is for example taken as a basis in ascertaining the first set point value ml_soll. In addition, a third set point value Lbd_wunsch of a combustion-air ratio of the mixture to be adjusted in the combustion chamber within the working cycle associated with the first set point value ml_soll and with the second set point value AGR_soll is ascertained by means of the electronic computing device in that the third set point value Lbd_wunsch is retrieved from a third characteristic map KF_3 stored in the memory device depending on the current speed n_mot of the internal combustion engine and depending on the current amount ml_ist of the air supplied to the combustion chamber. The first set point value ml_soll is an air mass set point value, which characterizes an air mass, which is required for actually realizing the torque demand. In the first characteristic map KF_1, thus, the air mass required for torque realization is stored as a function of the current engine speed and demanded torque. Therein, the provision of the optimum EGR rate is taken as a basis. In the second characteristic map KF_2, the optimum EGR rate (EGR set point value or AGR_soll) is stored as a function of the engine speed (n_mot) and the current air mass (ml_ist). The third characteristic map KF_3 contains the lambda value associated with the EGR set point value and with the current air mass as a function of the engine speed and the current air mass, wherein the lambda value is also referred to as Lambda_fahrerwunsch and is characterized by the third set point value Lbd_wunsch.

In the first embodiment, a fourth set point value Lbd_0 of the combustion-air ratio to be adjusted in the combustion chamber within the working cycle, which is also referred to as lambda ($\lambda$), is ascertained by means of the electronic computing device in that the fourth set point value Lbd_0 is retrieved from a fourth characteristic map KF_4 stored in the memory device depending on the current speed n_mot of the internal combustion engine and depending on the current amount ml_ist of the air supplied to the combustion chamber, wherein a knock-free operation of the internal combustion engine without exhaust gas recirculation is achievable or could be achieved by adjusting the combustion-air ratio to the fourth set point value Lbd_0. By means of the electronic computing device, an interpolation, in particular a linear interpolation, between the third set point value and the fourth set point value is performed, whereby a fifth set point value of the combustion-air ratio to be adjusted in the combustion chamber within the working cycle is ascertained, wherein the combustion-air ratio is adjusted to the fifth set point value by means of the electronic computing device. Thus, it is provided that the fourth set point value is only used as an auxiliary or basic value to calculate the fifth set point value based on the fourth set point value and based on the third set point value. In addition, it is provided in the first embodiment that a sixth set point value ZW_wunsch of an ignition timing associated with the second set point value and with the current amount of the air supplied to the combustion chamber is ascertained by means of the electronic computing device in that the sixth set point value ZW_wunsch is retrieved from a fifth characteristic map KF_5 stored in the memory device depending on the current speed n_mot and depending on the current amount ml_ist of the air supplied to the combustion chamber. In addition, it is provided in the first embodiment that a seventh set point value ZW_0 of the ignition timing is ascertained by means of the electronic computing device in that the seventh set point value ZW_0 is retrieved from a sixth characteristic map KF_6 depending on the current speed n_mot and depending on the current amount ml_ist of the air supplied to the combustion chamber, wherein a knock-free operation of the internal combustion engine without exhaust gas recirculation is achievable by adjusting the ignition timing to the seventh set point value. In addition, an interpolation, in particular a linear interpolation, between the sixth set point value and the seventh set point value is performed by means of the electronic computing device, whereby an eighth set point value of the ignition timing is ascertained, wherein the ignition timing is actually adjusted to the eighth set point value by means of the electronic computing device. The mixture in the combustion chamber is ignited at the ignition timing, whereby a combustion of the mixture is effected. In other words, the fifth characteristic map KF_5 contains the ignition timing associated with the EGR set point value and with the current air mass and also referred to as ignition angle as a function of the engine speed and the current air mass, wherein this ignition angle associated with the EGR set point value and with the current air mass is characterized by ZW_wunsch. In the sixth characteristic map KF_6, the ignition angle is stored as a function of current air mass and engine speed, which allows a knock-free operation without EGR (exhaust gas recirculation).

Preferably but not necessarily, the internal combustion engine includes at least one exhaust gas turbocharger, which includes a turbine drivable by exhaust gas of the internal combustion engine and a compressor drivable by the turbine for compressing the air to be supplied to the combustion chamber. A bypass device also referred to as waste gate, via which at least a part of the exhaust gas of the internal combustion engine can bypass the turbine, is associated with the turbine. The exhaust gas bypassing the turbine does not drive the turbine. In order to adjust an amount of the exhaust gas bypassing the turbine, a valve device also referred to as waste gate valve is provided. Further, a throttle valve is for example arranged in the intake tract, by means of which an amount of the air to be supplied to the combustion chamber can be adjusted. For example, the air mass or an amount of air to be supplied to the combustion chamber within the working cycle is adjusted to the first set point value ml_soll by means of the valve device and by means of the throttle valve, in particular in a closed control loop or by means of a closed control loop. Thereto, the air mass is determined via different methods for example by means of an air mass gauge and/or by means of a throttle valve model and/or by means of an intake manifold model. The associated EGR rate is for example adjusted by means of an EGR valve by means of or in a closed control loop. In other words, an amount of recirculated exhaust gas to be supplied to the combustion chamber within the working cycle is adjusted to the second set point value AGR_soll, in particular by means of the EGR valve. The EGR rate is determined via different methods, such as for example a Venturi measurement of an EGR flow, an intake manifold model, a measurement of the oxygen or water condensation in the intake manifold. The ascertainment of the fifth set point value is effected as a linear interpolation between Lbd_0 and Lbd_wunsch in particular considering the current EGR rate and the EGR set point value. The fifth set point value is adjusted by adjustment of injection parameter, based on which the fuel is taken into the combustion chamber, and for example measured by means of a lambda probe and adjusted in a closed control loop. The injection parameter for example includes a pressure, in particular a hydrogen pressure, with which the fuel is taken into the combustion chamber, but in particular not necessarily directly blown into the combustion chamber. Further, the injection parameters can include an injection period. The injection period is a period of time, during which the fuel is taken, in particular directly blown, into the combustion chamber.

The ascertainment of the eighth set point value is effected by linear interpolation between ZW_0 and ZW_wunsch in particular considering the current EGR rate and the EGR set point value. The ignition timing also referred to as ignition angle is for example adjusted to the eighth set point value by the engine control unit considering the set point angle. The fifth set point value is denoted by Lbd_soll, wherein the eighth set point value is denoted by ZW_soll. A current amount of recirculated exhaust gas supplied to the combustion chamber is to be understood by the current EGR rate, wherein the current EGR rate or the current amount of recirculated exhaust gas supplied to the combustion chamber is denoted by AGR_ist in FIG. 1. It is apparent from FIG. 1 that a difference is formed of Lbd_0 and Lbd_wunsch. In addition, a quotient of AGR_ist and AGR_soll is formed, wherein the quotient is multiplied by the difference. The result of this multiplication is subtracted from Lbd_0, whereby Lbd_soll is calculated. ZW_soll is correspondingly calculated.

Figure 2:
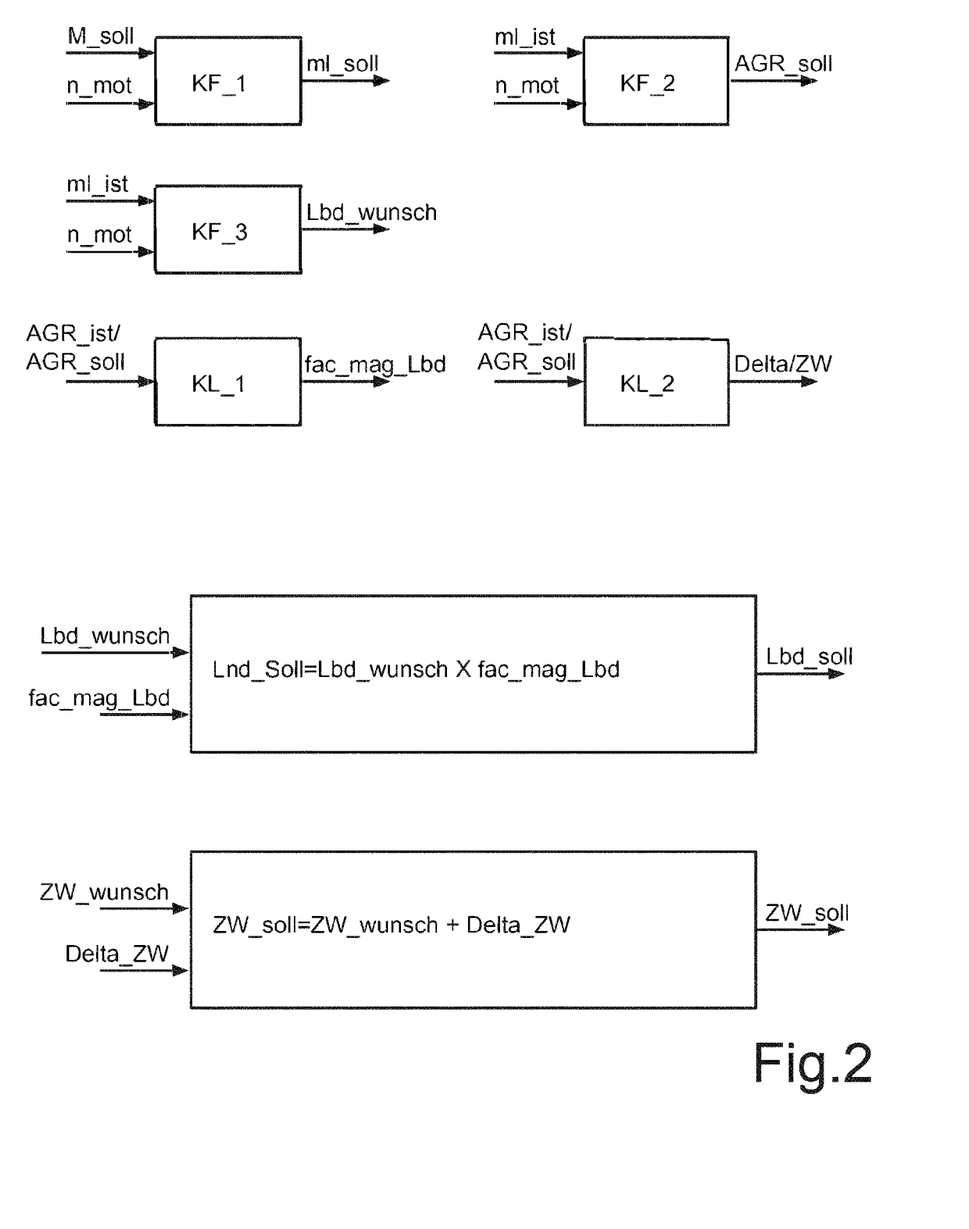
FIG. 2 diagrams for illustrating a second embodiment of the method.

FIG. 2 shows a second embodiment of the method. A difference between the first and the second embodiment is in that a leaning factor fac_mag_Lbd, which is greater than or equal to 1, is ascertained based on a first characteristic line KL_1 depending on a ratio between the second set point value AGR_soll and the current amount AGR_ist of the recirculated exhaust gas supplied to the combustion chamber by means of the electronic computing device. In other words, there applies: fac_mag_Lbd≥1. Hereto, a quotient of AGR_ist and AGR_soll is ascertained, based on which the leaning factor is ascertained, in particular calculated, based on the first characteristic line KL_1. Again expressed in other words, the leaning factor is stored as a function of the quotient of AGR_ist and AGR_soll in the characteristic line KL_1. In addition, a distance value Delta_ZW, which is also referred to as offset or offset value, is ascertained based on a second characteristic line KL_2 depending on a ratio between the second set point value AGR_soll and the current amount AGR_ist of the recirculated exhaust gas supplied to the combustion chamber by means of the electronic computing device. In other words, the offset is stored as a function of the quotient of AGR_ist and AGR_soll in the second characteristic line KL_2. In addition, ZW_wunsch is for example ascertained in the described manner in the second embodiment. The set point value ZW_soll of the ignition timing is for example ascertained in that Delta_ZW is added to ZW_wunsch, wherein the ignition timing is adjusted to the set point value ZW_soll by means of the electronic computing device. In addition, Lbd_soll is ascertained in that the leaning factor fac_mag_Lbd is multiplied by Lbd_wunsch. The amount of the air to be supplied to the combustion chamber within the working cycle is adjusted to the first set point value ml_soll for example via the valve device and the throttle valve, in particular by means of or in a closed control loop. Hereto, the air mass is determined via different methods such as for example by an air mass gauge and/or by a throttle valve and/or an intake manifold model. The associated EGR rate or an amount of exhaust gas to be supplied to the combustion chamber within the working cycle is adjusted to the second set point value AGR_soll, wherein the EGR rate is for example determined via different methods. In particular, the EGR rate or the second set point value AGR_soll is adjusted by means of a closed control loop and therein in particular by means of an EGR valve such that a particularly advantageous operation can be realized. A determination of ZW_soll is effected by addition of ZW_wunsch to Delta_ZW. The ignition timing is actually adjusted to ZW_soll by the engine control unit in particular considering the set point angle, and the combustion-air ratio is actually adjusted to Lbd_soll. In particular, Lbd_soll is adjusted by adjusting the injection parameters and measured by means of the lambda probe. Preferably, Lbd_soll is adjusted in a closed control loop.

Figure 3:
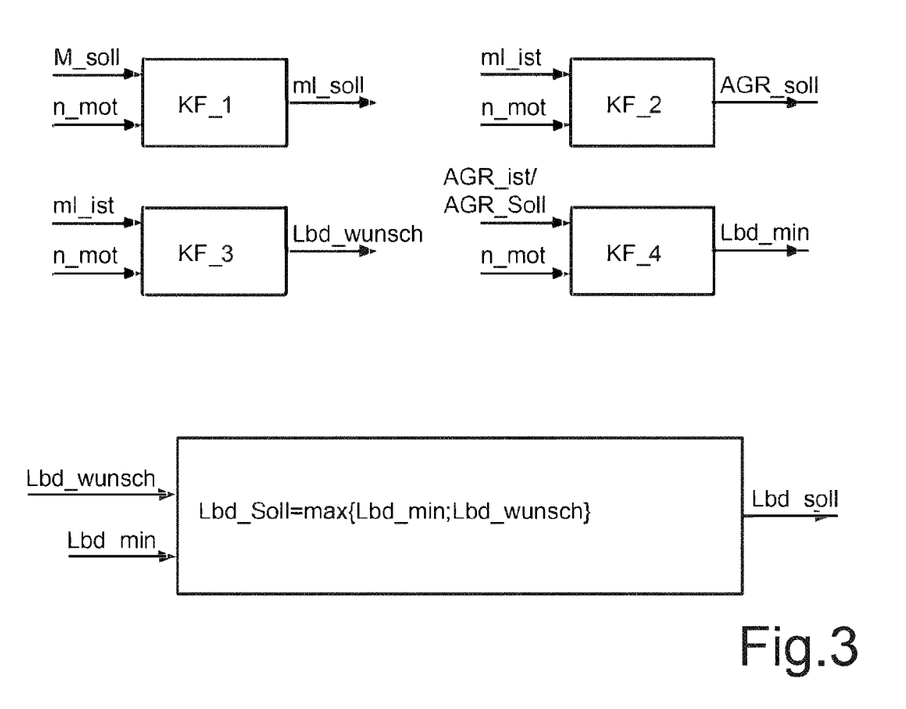
FIG. 3 diagrams for illustrating a third embodiment of the method.

FIG. 3 shows a third embodiment of the method. In the third embodiment, a minimally admissible limit value Lbd_min of the combustion-air ratio to be adjusted in the combustion chamber within the working cycle is ascertained by means of the electronic computing device in that the minimally admissible limit value Lbd_min is retrieved from the fourth characteristic map KF_4 depending on the current speed n_mot of the internal combustion engine and depending on a ratio between the second set point value AGR_soll and the current amount of the recirculated exhaust gas AGR_ist supplied to the combustion chamber. In other words, a quotient of AGR_ist and AGR_soll is ascertained. Depending on the quotient and depending on the current speed n_mot, the minimally admissible limit value Lbd_min is retrieved from the fourth KF_4 or from a seventh characteristic map KF_7. In addition, in the third embodiment, the third set point value Lbd_wunsch is used as a first selection value, and the minimally admissible limit value Lbd_min is used as a second selection value. The electronic computing device selects the greater one of the selection values from the selection values, wherein the combustion-air ratio is adjusted to the selected selection value by means of the electronic computing device. Overall, it is apparent that the minimally admissible limit value Lbd_min also referred to as lambda limit value is stored in the fourth characteristic map as a function of the engine speed and the quotient of AGR_ist and AGR_soll. For determining Lbd_soll, to which the combustion-air ratio is actually adjusted, a maximum selection between the lambda limit value (Lbd_min) and Lambda_fahrerwunsch or Lbd_wunsch is effected. Lbd_soll is for example actually adjusted by adjustment of the injection parameters and the ignition angle is for example adjusted as in the first embodiment or as in the second embodiment. Overall, it is apparent that the second set point value characterizes the amount of the recirculated exhaust gas to be taken into the combustion chamber within the working cycle in the first embodiment, in the second embodiment and in the third embodiment.

Figure 4:
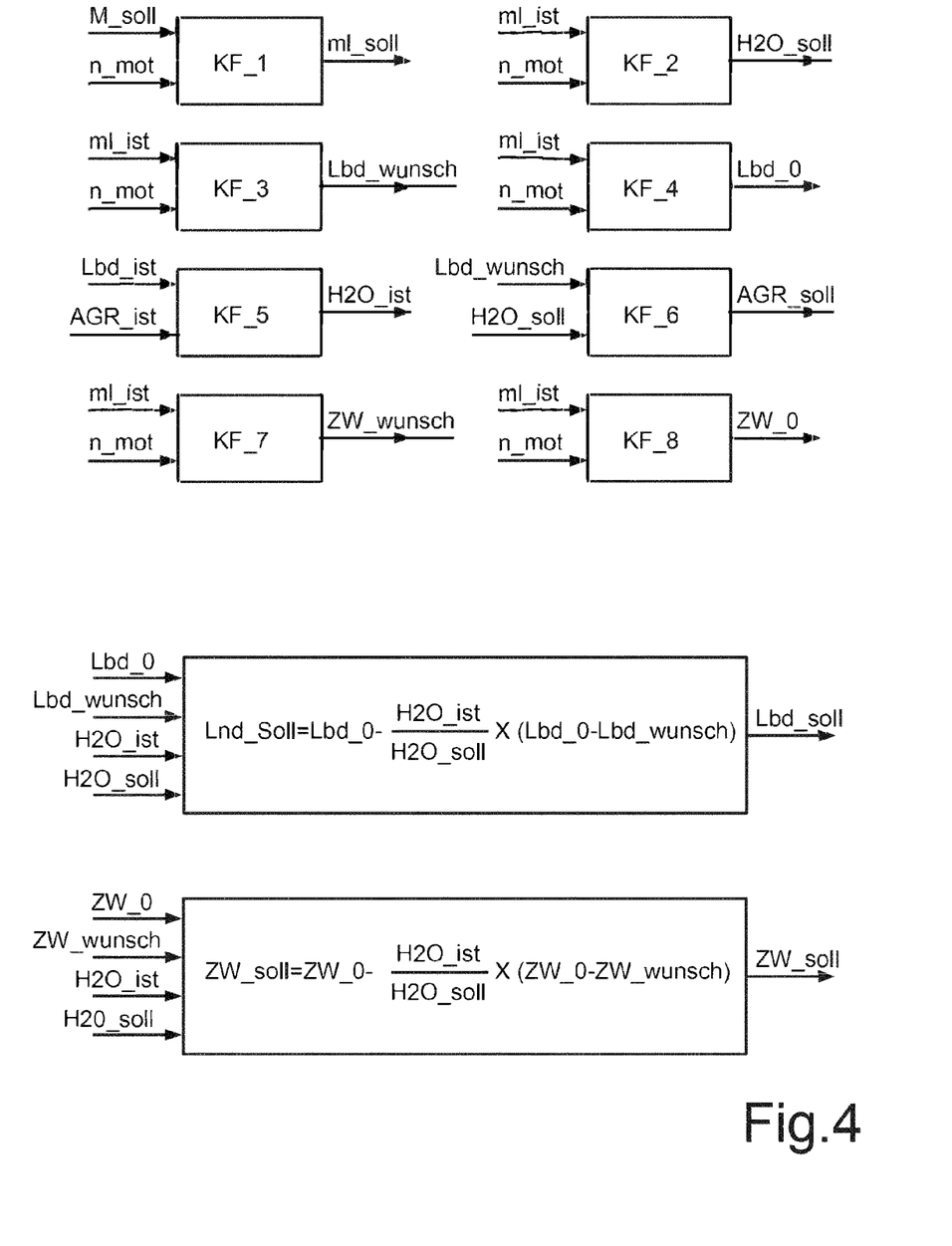
FIG. 4 diagrams for illustrating a fourth embodiment of the method.

FIG. 4 shows a fourth embodiment, in which the second set point value is a second set point value, H2O_soll, of an amount of water, in particular water vapor, contained in the mixture to be taken into the combustion chamber within the working cycle. Herein too, the second set point value H2O_soll is retrieved from the second characteristic map KF_2 or from a tenth characteristic map KF_10 depending on ml_ist and n_mot. The fourth embodiment is based on the realization that the water vapor content in the mixture also referred to as intake mixture is crucial for the knocking resistance and the reduction of nitrogen oxide emissions (NO$_x$ emissions). The fourth embodiment has the advantage that a too rich mixture with increased nitrogen oxide formation and increased knocking tendency cannot arise by the interpolation. In the fourth embodiment, a current water content or an actual value H2O_ist of an amount of water contained in a mixture currently supplied to the combustion chamber is ascertained by means of the electronic computing device in that the actual value H2O_ist is retrieved from the fifth characteristic map KF_5 or from an eighth characteristic map KF_8 depending on a current combustion-air ratio Lbd_ist in the combustion chamber and depending on the current amount AGR_ist of the recirculated exhaust gas supplied to the combustion chamber.

By means of the electronic computing device, a set point value AGR_soll of the amount of recirculated exhaust gas to be taken into the combustion chamber within the working cycle is ascertained in that the set point value AGR_soll is retrieved from the sixth characteristic map KF_6 or from a ninth characteristic map KF_9 depending on the third set point value Lbd_wunsch and depending on the set point value H2O_soll. By means of the electronic computing device, a set point value ZW_wunsch of the ignition timing associated with the set point value H2O_soll and with the current amount ml_ist of the air supplied to the combustion chamber is ascertained in that the set point value ZW_wunsch is retrieved from a seventh characteristic map KF_7 or from a fifth characteristic map KF_5 depending on the current speed n_mot and depending on the current amount ml_ist of the air supplied to the combustion chamber. In addition, a set point value ZW_0 of the ignition timing is ascertained by means of the electronic computing device in that the set point value ZW_0 is retrieved from an eighth characteristic map KF_8 or from a sixth characteristic map KF_6 depending on the current speed n_mot and depending on the current amount ml_ist of the air supplied to the combustion chamber, wherein a knock-free operation of the internal combustion engine without exhaust gas recirculation is achievable for example by adjusting the ignition timing to the set point value ZW_0.

Lbd_soll or ZW_soll are ascertained, in particular calculated, similar as in the first embodiment, in particular with the difference that a quotient of H2O_ist and H2O_soll is used instead of the quotient of AGR_ist and AGR_soll. In other words, it is apparent from FIG. 4 that the lambda value is stored as a function of air mass and speed in the fourth characteristic map, which allows a knock-free operation without EGR (no water vapor). In the eighth fifth characteristic map, the water vapor content in the intake mixture is determined from the current lambda and the current EGR rate. In the ninth or sixth characteristic map, the EGR set point value is ascertained from Lambda_fahrerwunsch and water vapor set point value. The fifth or seventh characteristic map contains the ignition angle associated with the H2O set point value and with the current air mass as a function of the engine speed and the current air mass. In the sixth or eighth characteristic map, the ignition angle is stored as a function of current air mass and engine speed, which allows a knock-free operation without EGR. The air mass is adjusted in a closed control loop for example via the valve device and the throttle valve. In other words, the amount of air to be supplied to the combustion chamber within the working cycle is adjusted to Lbd_soll. In addition, the ignition timing or ignition angle is adjusted to ZW_soll for the working cycle.

For example, the EGR rate is adjusted by means of the EGR valve in the closed control loop. The determination of Lbd_soll is for example effected by linear interpolation between Lbd_0 and Lbd_wunsch, in particular considering the current water vapor content and considering the water vapor set point value, wherein the linear interpolation is performed by means of the computing device. Lbd_soll is adjusted by adjusting the injection parameters and for example measured by means of the lambda probe and adjusted in a closed control loop. ZW_soll is calculated by linear interpolation between ZW_0 and ZW_wunsch considering the current water vapor content and considering the water vapor set point value, wherein the ignition angle is for example actually adjusted to ZW soli. The current water vapor content is characterized by H2O_ist, while the water vapor set point value is characterized by H2O_soll.

Figure 5:
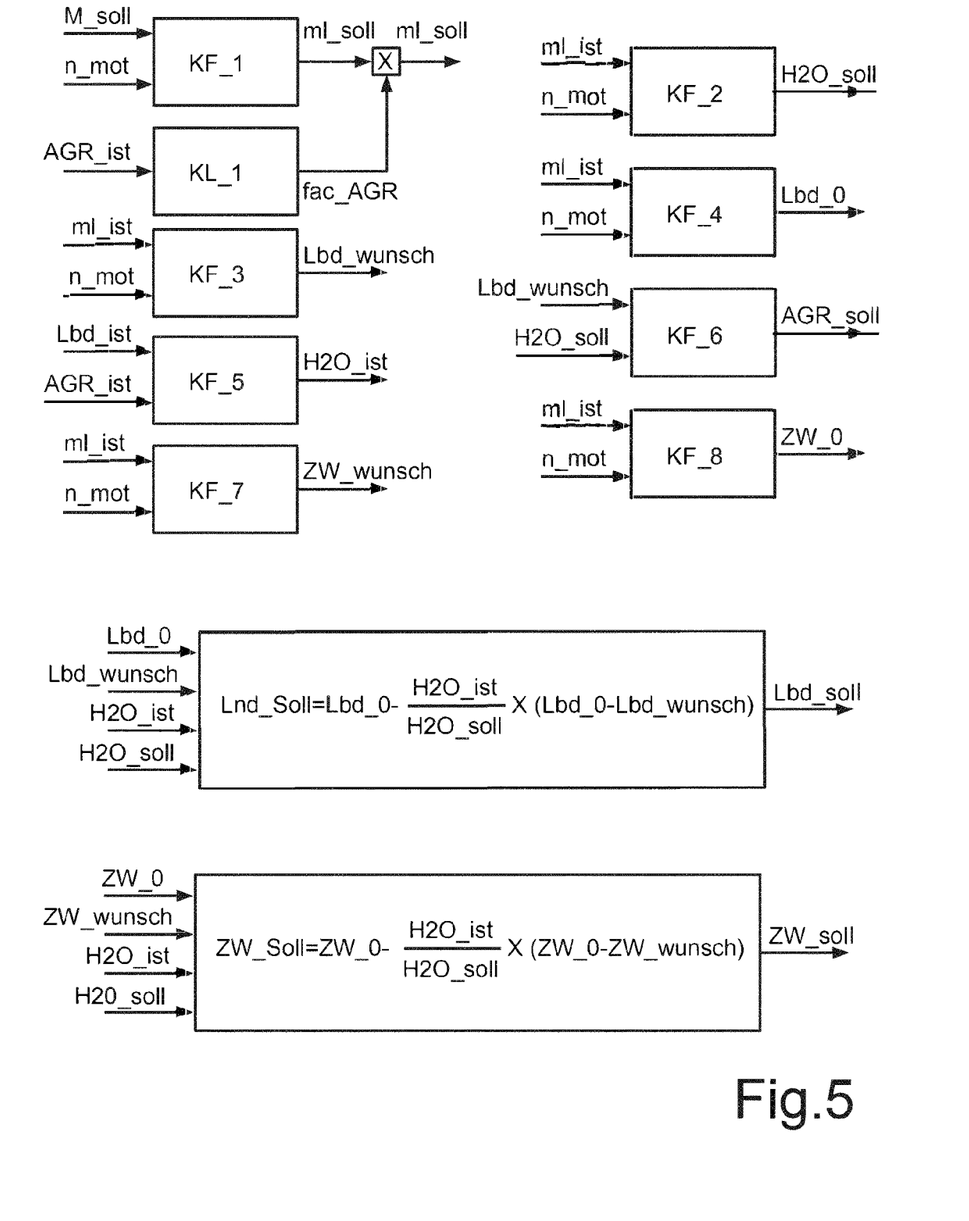
FIG. 5 diagrams for illustrating a fifth embodiment of the method.

Finally, FIG. 5 shows a fifth embodiment of the method. In the fifth embodiment too, the eleventh or the second set point value is the set point value H2O_soll with the amount of water or water vapor contained in the mixture to be taken into the combustion chamber within the working cycle. Based on a third characteristic line KL_3 or based on a characteristic line KL_1, a factor fac_AGR is ascertained depending on the current amount AGR_ist of the recirculated exhaust gas supplied to the combustion chamber by means of the electronic computing device, wherein the factor fac_AGR is less than or equal to 1. Furthermore, the first set point value ml_soll is ascertained in the described manner. In addition, the first set point value ml_soll is multiplied by the factor fac_AGR by means of the electronic computing device, whereby a further or fifteenth set point value ml_soll_0 of the amount of the air to be taken into the combustion chamber within the working cycle of the internal combustion engine is ascertained, in particular calculated. Thus, it is provided in the fifth embodiment that the amount, which is supplied to the combustion chamber within the working cycle, is adjusted to the further set point value ml_soll_0, in particular by means of the valve device and/or by means of the throttle valve. For example, the amount of the air also referred to as air mass, which is supplied to the combustion chamber within the working cycle, is adjusted to the further set point value ml_soll-0 by means of or in a closed control loop, in particular by means of the electronic computing device. It is apparent from FIG. 5 that the air mass required for torque realization and characterized by the set point value ml_soll is reduced by the factor fac_AGR depending on the EGR rate, in particular if the factor fac_AGR is less than 1. Furthermore, the fifth embodiment corresponds to the fourth embodiment.

The invention claimed is:

1. A method for operating an internal combustion engine comprising at least one combustion chamber, comprising the steps:
- by an electronic computing device: ascertaining a first set point value of an amount of air to be taken into the combustion chamber of the internal combustion engine within a working cycle thereof in that the first set point value is retrieved from a first characteristic map stored in a memory device of the electronic computing device depending on a current speed of the internal combustion engine and depending on a torque to be provided by the internal combustion engine and controls at least one component of the internal combustion engine to adjust the amount of air to the first set point value;
- by the electronic computing device: ascertaining a second set point value in that the second set point value is retrieved from a second characteristic map stored in the memory device of the electronic computing device depending on the current speed of the internal combustion engine and depending on a current amount of air supplied to the combustion chamber;
  wherein the second set point value is:
    a second set point value of an amount of water contained in a mixture to be taken into the combustion chamber within the working cycle;
- by the electronic computing device: controlling the amount of water supplied to the combustion chamber within the working cycle to the second set point value;
- by the electronic computing device: ascertaining a third set point value of a combustion-air ratio to be adjusted in the combustion chamber within the working cycle associated with the first set point value and with the second set point value in that the third set point value is retrieved from a third characteristic map stored in the memory device depending on the current speed of the internal combustion engine and depending on the current amount of the air supplied to the combustion chamber; and
- by the electronic computing device: controlling injection parameters to adjust the combustion-air ratio in the combustion chamber within the working cycle to the third set point value.

2. A method for operating an internal combustion engine comprising at least one combustion chamber, comprising the steps:
- by an electronic computing device: ascertaining a first set point value of an amount of air to be taken into the combustion chamber of the internal combustion engine within a working cycle thereof in that the first set point value is retrieved from a first characteristic map stored in a memory device of the electronic computing device depending on a current speed of the internal combustion engine and depending on a torque to be provided by the internal combustion engine and controls at least one component of the internal combustion engine to adjust the amount of air to the first set point value;
- by the electronic computing device: ascertaining a second set point value in that the second set point value is retrieved from a second characteristic map stored in the memory device of the electronic computing device depending on the current speed of the internal combustion engine and depending on a current amount of air supplied to the combustion chamber;
  wherein the second set point value is:
    a second set point value of an amount of recirculated exhaust gas to be taken into the combustion chamber within the working cycle, or
    a second set point value of an amount of water contained in a mixture to be taken into the combustion chamber within the working cycle;
- by the electronic computing device: controlling an EGR valve to adjust the amount of recirculated exhaust gas or the amount of water supplied to the combustion chamber within the working cycle to the second set point value;
- by the electronic computing device: ascertaining a third set point value of a combustion-air ratio to be adjusted in the combustion chamber within the working cycle associated with the first set point value and with the second set point value in that the third set point value is retrieved from a third characteristic map stored in the memory device depending on the current speed of the internal combustion engine and depending on the current amount of the air supplied to the combustion chamber; and
- by the electronic computing device: controlling injection parameters to adjust the combustion-air ratio in the combustion chamber within the working cycle to the third set point value;
- wherein a fourth set point value of the combustion-air ratio to be adjusted in the combustion chamber within the working cycle is ascertained by the electronic computing device in that the fourth set point value is retrieved from a fourth characteristic map stored in the memory device depending on the current speed of the internal combustion engine and depending on the current amount of the air supplied to the combustion chamber, wherein a knock-free operation of the internal combustion engine without exhaust gas recirculation is achievable by adjusting the combustion-air ratio to the fourth set point value;
- wherein a fifth set point value of the combustion-air ratio to be adjusted in the combustion chamber within the working cycle is ascertained by interpolation between the third set point value and the fourth set point value by the electronic computing device, wherein the combustion-air ratio is adjusted to the fifth set point value by the electronic computing device.

3. A method for operating an internal combustion engine comprising at least one combustion chamber, comprising the steps:
- by an electronic computing device: ascertaining a first set point value of an amount of air to be taken into the combustion chamber of the internal combustion engine within a working cycle thereof in that the first set point value is retrieved from a first characteristic map stored in a memory device of the electronic computing device depending on a current speed of the internal combustion engine and depending on a torque to be provided by the internal combustion engine and controls at least one component of the internal combustion engine to adjust the amount of air to the first set point value;

by the electronic computing device: ascertaining a second set point value in that the second set point value is retrieved from a second characteristic map stored in the memory device of the electronic computing device depending on the current speed of the internal combustion engine and depending on a current amount of air supplied to the combustion chamber;

wherein the second set point value is:
- a second set point value of an amount of recirculated exhaust gas to be taken into the combustion chamber within the working cycle, or
- a second set point value of an amount of water contained in a mixture to be taken into the combustion chamber within the working cycle;

by the electronic computing device: controlling an EGR valve to adjust the amount of recirculated exhaust gas or the amount of water supplied to the combustion chamber within the working cycle to the second set point value;

by the electronic computing device: ascertaining a third set point value of a combustion-air ratio to be adjusted in the combustion chamber within the working cycle associated with the first set point value and with the second set point value in that the third set point value is retrieved from a third characteristic map stored in the memory device depending on the current speed of the internal combustion engine and depending on the current amount of the air supplied to the combustion chamber; and by the electronic computing device: controlling injection parameters to adjust the combustion-air ratio in the combustion chamber within the working cycle to the third set point value;

wherein a sixth set point value of an ignition timing associated with the second set point value and with the current amount of the air supplied to the combustion chamber is ascertained by the electronic computing device in that the sixth set point value is retrieved from a fifth characteristic map depending on the current speed and depending on the current amount of the air supplied to the combustion chamber.

4. The method according to claim 3,
wherein a seventh set point value of the ignition timing is ascertained by the electronic computing device in that the seventh set point value is retrieved from a sixth characteristic map depending on the current speed and depending on the current amount of the air supplied to the combustion chamber, wherein a knock-free operation of the internal combustion engine without exhaust gas recirculation is achievable by adjusting the ignition timing to the seventh set point value.

5. The method according to claim 4,
wherein an eighth set point value of the ignition timing is ascertained by interpolation between the sixth set point value and the seventh set point value, wherein the ignition timing is adjusted to the eighth set point value by the electronic computing device.

6. A method for operating an internal combustion engine comprising at least one combustion chamber, comprising the steps:
by an electronic computing device: ascertaining a first set point value of an amount of air to be taken into the combustion chamber of the internal combustion engine within a working cycle thereof in that the first set point value is retrieved from a first characteristic map stored in a memory device of the electronic computing device depending on a current speed of the internal combustion engine and depending on a torque to be provided by the internal combustion engine and controls at least one component of the internal combustion engine to adjust the amount of air to the first set point value;

by the electronic computing device: ascertaining a second set point value in that the second set point value is retrieved from a second characteristic map stored in the memory device of the electronic computing device depending on the current speed of the internal combustion engine and depending on a current amount of air supplied to the combustion chamber;

wherein the second set point value is:
- a second set point value of an amount of recirculated exhaust gas to be taken into the combustion chamber within the working cycle, or
- a second set point value of an amount of water contained in a mixture to be taken into the combustion chamber within the working cycle;

by the electronic computing device: controlling an EGR valve to adjust the amount of recirculated exhaust gas or the amount of water supplied to the combustion chamber within the working cycle to the second set point value;

by the electronic computing device: ascertaining a third set point value of a combustion-air ratio to be adjusted in the combustion chamber within the working cycle associated with the first set point value and with the second set point value in that the third set point value is retrieved from a third characteristic map stored in the memory device depending on the current speed of the internal combustion engine and depending on the current amount of the air supplied to the combustion chamber; and by the electronic computing device: controlling injection parameters to adjust the combustion-air ratio in the combustion chamber within the working cycle to the third set point value;

wherein a leaning factor, which is greater than or equal to 1, is ascertained based on a first characteristic line depending on a ratio between the second set point value and a current amount of recirculated exhaust gas supplied to the combustion chamber by the electronic computing device.

7. The method according to claim 6,
wherein a fourth set point value of the combustion-air ratio to be adjusted in the combustion chamber within the working cycle is ascertained by the electronic computing device in that the third set point value is multiplied by the leaning factor, wherein the combustion-air ratio is adjusted to the fourth set point value by the electronic computing device.

8. The method according to claim 6, wherein:
a fifth set point value of an ignition timing associated with the second set point value and with the current amount of the air supplied to the combustion chamber is ascertained by the electronic computing device in that the fifth set point value is retrieved from a fourth characteristic map depending on the current speed and depending on the current amount of the air supplied to the combustion chamber; and a distance value is ascertained based on a second characteristic line depending on a ratio between the second set point value and the current amount of the recirculated exhaust gas supplied to the combustion chamber by the electronic computing device, which is added to the fifth set point value, whereby a sixth set point value of the ignition timing is ascertained, wherein the ignition timing is adjusted to the sixth set point value by the electronic computing device.

9. A method for operating an internal combustion engine comprising at least one combustion chamber, comprising the steps:
by an electronic computing device: ascertaining a first set point value of an amount of air to be taken into the combustion chamber of the internal combustion engine within a working cycle thereof in that the first set point value is retrieved from a first characteristic map stored in a memory device of the electronic computing device depending on a current speed of the internal combustion engine and depending on a torque to be provided by the internal combustion engine and controls at least one component of the internal combustion engine to adjust the amount of air to the first set point value;
by the electronic computing device: ascertaining a second set point value in that the second set point value is retrieved from a second characteristic map stored in the memory device of the electronic computing device depending on the current speed of the internal combustion engine and depending on a current amount of air supplied to the combustion chamber;
wherein the second set point value is:
a second set point value of an amount of recirculated exhaust gas to be taken into the combustion chamber within the working cycle, or
a second set point value of an amount of water contained in a mixture to be taken into the combustion chamber within the working cycle;
by the electronic computing device: controlling an EGR valve to adjust the amount of recirculated exhaust gas or the amount of water supplied to the combustion chamber within the working cycle to the second set point value;
by the electronic computing device: ascertaining a third set point value of a combustion-air ratio to be adjusted in the combustion chamber within the working cycle associated with the first set point value and with the second set point value in that the third set point value is retrieved from a third characteristic map stored in the memory device depending on the current speed of the internal combustion engine and depending on the current amount of the air supplied to the combustion chamber; and
by the electronic computing device: controlling injection parameters to adjust the combustion-air ratio in the combustion chamber within the working cycle to the third set point value;
wherein a minimally admissible limit value of the combustion-air ratio to be adjusted in the combustion chamber within the working cycle is ascertained by the electronic computing device in that the minimally admissible limit value is retrieved from a fourth characteristic map depending on the current speed of the internal combustion engine and depending on a ratio between the second set point value and a current amount of recirculated exhaust gas supplied to the combustion chamber.

10. The method according to claim 9,
wherein the third set point value is used as a first selection value and the minimally admissible limit value is used as a second selection value, wherein the electronic computing device selects the greater one of the selection values from the selection values, and wherein the combustion-air ratio is adjusted to the selected selection value by the electronic computing device.

11. A method for operating an internal combustion engine comprising at least one combustion chamber, comprising the steps:
by an electronic computing device: ascertaining a first set point value of an amount of air to be taken into the combustion chamber of the internal combustion engine within a working cycle thereof in that the first set point value is retrieved from a first characteristic map stored in a memory device of the electronic computing device depending on a current speed of the internal combustion engine and depending on a torque to be provided by the internal combustion engine and controls at least one component of the internal combustion engine to adjust the amount of air to the first set point value;
by the electronic computing device: ascertaining a second set point value in that the second set point value is retrieved from a second characteristic map stored in the memory device of the electronic computing device depending on the current speed of the internal combustion engine and depending on a current amount of air supplied to the combustion chamber;
wherein the second set point value is:
a second set point value of an amount of recirculated exhaust gas to be taken into the combustion chamber within the working cycle, or
a second set point value of an amount of water contained in a mixture to be taken into the combustion chamber within the working cycle;
by the electronic computing device: controlling an EGR valve to adjust the amount of recirculated exhaust gas or the amount of water supplied to the combustion chamber within the working cycle to the second set point value;
by the electronic computing device: ascertaining a third set point value of a combustion-air ratio to be adjusted in the combustion chamber within the working cycle associated with the first set point value and with the second set point value in that the third set point value is retrieved from a third characteristic map stored in the memory device depending on the current speed of the internal combustion engine and depending on the current amount of the air supplied to the combustion chamber; and
by the electronic computing device: controlling injection parameters to adjust the combustion-air ratio in the combustion chamber within the working cycle to the third set point value;
wherein a fourth set point value of the combustion-air ratio to be adjusted in the combustion chamber within the working cycle is ascertained by the electronic computing device in that the fourth set point value is retrieved from a fourth characteristic map stored in the memory device depending on the current speed of the internal combustion engine and depending on the current amount of the air supplied to the combustion chamber, wherein a knock-free operation of the internal combustion engine without exhaust gas recirculation is achievable by adjusting the combustion-air ratio to the fourth set point value;
wherein an actual value of an amount of water contained in a mixture currently supplied to the combustion chamber is ascertained by the electronic computing device in that the actual value is retrieved from a fifth characteristic map depending on a current combustion air ratio in the combustion chamber and depending on a current amount of recirculated exhaust gas supplied to the combustion chamber.

12. The method according to claim 11,
wherein a fifth set point value of the amount of recirculated exhaust gas to be taken into the combustion chamber within the working cycle is ascertained by the electronic computing device in that the fifth set point value is retrieved from a sixth characteristic map depending on the third set point value and depending on the second set point value;
wherein the second set point value is of an amount of water contained in a mixture to be taken into the combustion chamber within the working cycle.

13. The method according to claim 12, wherein:
a sixth set point value of an ignition timing associated with the second set point value and with the current amount of the air supplied to the combustion chamber is ascertained by the electronic computing device in that the sixth set point value is retrieved from a seventh characteristic map depending on the current speed and depending on the current amount of the air supplied to the combustion chamber; and
a seventh set point value of the ignition timing is ascertained by the electronic computing device in that the seventh set point value is retrieved from an eighth characteristic map depending on the current speed and depending on the current amount of the air supplied to the combustion chamber, wherein a knock-free operation of the internal combustion engine without exhaust gas recirculation is achievable by adjusting the ignition timing to the seventh set point value.

14. The method according to claim 13,
wherein an eighth set point value of the ignition angle is ascertained by interpolation between the sixth set point value and the seventh set point value by the electronic computing device, wherein the ignition angle is adjusted to the eighth set point value by the electronic computing device.

15. A method for operating an internal combustion engine comprising at least one combustion chamber, comprising the steps:
by an electronic computing device: ascertaining a first set point value of an amount of air to be taken into the combustion chamber of the internal combustion engine within a working cycle thereof in that the first set point value is retrieved from a first characteristic map stored in a memory device of the electronic computing device depending on a current speed of the internal combustion engine and depending on a torque to be provided by the internal combustion engine and controls at least one component of the internal combustion engine to adjust the amount of air to the first set point value;
by the electronic computing device: ascertaining a second set point value in that the second set point value is retrieved from a second characteristic map stored in the memory device of the electronic computing device depending on the current speed of the internal combustion engine and depending on a current amount of air supplied to the combustion chamber;
wherein the second set point value is:
a second set point value of an amount of recirculated exhaust gas to be taken into the combustion chamber within the working cycle, or
a second set point value of an amount of water contained in a mixture to be taken into the combustion chamber within the working cycle;
by the electronic computing device: controlling an EGR valve to adjust the amount of recirculated exhaust gas or the amount of water supplied to the combustion chamber within the working cycle to the second set point value;
by the electronic computing device: ascertaining a third set point value of a combustion-air ratio to be adjusted in the combustion chamber within the working cycle associated with the first set point value and with the second set point value in that the third set point value is retrieved from a third characteristic map stored in the memory device depending on the current speed of the internal combustion engine and depending on the current amount of the air supplied to the combustion chamber; and
by the electronic computing device: controlling injection parameters to adjust the combustion-air ratio in the combustion chamber within the working cycle to the third set point value;
wherein the at least one component of the internal combustion engine comprises a valve device and/or a throttle device;
wherein the valve device comprises a waste gate valve.

* * * * *